US011250747B2

(12) United States Patent
Park

(10) Patent No.: US 11,250,747 B2
(45) Date of Patent: Feb. 15, 2022

(54) DISPLAY DEVICE AND METHOD FOR DRIVING THE SAME

(71) Applicant: LG Display Co., Ltd., Seoul (KR)

(72) Inventor: Joon-Min Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/004,366

(22) Filed: Aug. 27, 2020

(65) Prior Publication Data

US 2021/0104185 A1 Apr. 8, 2021

(30) Foreign Application Priority Data

Oct. 2, 2019 (KR) ........................ 10-2019-0121935

(51) Int. Cl.

| | |
|---|---|
| ***G09G 3/30*** | (2006.01) |
| ***G06F 3/038*** | (2013.01) |
| ***G09G 5/00*** | (2006.01) |
| ***G09G 5/10*** | (2006.01) |
| ***G09G 3/00*** | (2006.01) |
| ***G09G 3/3258*** | (2016.01) |
| ***G09G 3/3291*** | (2016.01) |
| ***G09G 3/3266*** | (2016.01) |

(52) U.S. Cl.

CPC ........... *G09G 3/006* (2013.01); *G09G 3/3258* (2013.01); *G09G 3/3266* (2013.01); *G09G 3/3291* (2013.01); *G09G 2330/12* (2013.01)

(58) Field of Classification Search

CPC ..................... G09G 3/3233; G09G 2300/0819

See application file for complete search history.

(56) References Cited

U.S. PATENT DOCUMENTS

| | | | | |
|---|---|---|---|---|
| 10,410,561 | B2 | 9/2019 | Park | |
| 2011/0164025 | A1* | 7/2011 | Saito | H01L 51/001 345/212 |
| 2014/0176625 | A1* | 6/2014 | Yoon | G09G 3/3233 345/691 |
| 2017/0294166 | A1* | 10/2017 | Kim | G11C 19/28 |

FOREIGN PATENT DOCUMENTS

| | | | |
|---|---|---|---|
| KR | 10-2017-0081033 | A | 7/2017 |
| KR | 10-2018-0024854 | A | 3/2018 |
| KR | 10-2019-0070046 | A | 6/2019 |

* cited by examiner

*Primary Examiner* — Nan-Ying Yang

(74) *Attorney, Agent, or Firm* — Morgan, Lewis & Bockius LLP

(57) ABSTRACT

A display device includes: a display panel having a plurality of sub-pixels sharing a single reference voltage line, each of the sub-pixels comprising a switching transistor, a driving transistor, a sensing transistor, a storage capacitor, and a light-emitting element; a data driver configured to supply a data voltage to the plurality of sub-pixels; a gate driver configured to supply a gate signal to the plurality of sub-pixels; a timing controller configured to control the data driver and the gate driver; and a detector configured to sense a threshold voltage and mobility of the driving transistor to detect if there is a short-circuit between a gate electrode and an output terminal of the driving transistor.

11 Claims, 10 Drawing Sheets

DISPLAY DEVICE AND METHOD FOR DRIVING THE SAME

CROSS-REFERENCE TO RELATED APPLICATIONS

This application claims priority to Korean Patent Application No. 10-2019-0121935 filed in the Korean Intellectual Property Office on Oct. 2, 2019, the disclosure of which is incorporated herein by reference in its entirety as if fully set forth herein.

BACKGROUND

Technical Field

The present disclosure relates to a display device and a method for driving a display device, and more particularly, to a display device and a method for driving a display device that can detect if there is a short-circuit between a gate electrode and an output terminal of a driving transistor.

Description of the Related Art

Display devices employed by the monitor of a computer, a TV, a mobile phone or the like include an organic light-emitting display (OLED) that emits light by itself, and a liquid-crystal display (LCD) that requires a separate light source.

Among such various display devices, an organic light-emitting display device includes a display panel including a plurality of sub-pixels and drivers for driving the display panel. The drivers include a gate driver that supplies gate signals to the display panel and a data driver that supplies data voltages. When a signal such as a gate signal and a data voltage is supplied to a sub-pixel of the organic light-emitting display device, the selected sub-pixel emits light to display an image. A variety of transistors are disposed in the sub-pixels of the display panel. A short-circuit may be created between the electrodes of the transistors disposed in the sub-pixels during a fabricating process or after the fabricating process.

SUMMARY

Accordingly, embodiments of the present disclosure are directed to a display device and a method for driving the same that substantially obviate one or more of the problems due to limitations and disadvantages of the related art.

In view of the above, an object of the present disclosure is to provide a display device that can detect if there is a short-circuit between a gate electrode and an output terminal of a driving transistor in a sub-pixel, and a method for driving the display device.

Another object of the present disclosure is to provide a display device that can detect if there is a short-circuit between two electrodes of a storage capacitor in a sub-pixel, and a method for driving the display device.

Still another object of the present disclosure is to provide a display device that can address a sensing error which may occur in a structure where a plurality of sub-pixels shares a reference voltage line.

Yet another object of the present disclosure is to provide a display device capable of sensing in the same manner as a switching transistor and a sensing transistor of a sub-pixel are connected to separate lines in a structure where the switching transistor and the sensing transistor share a gate line.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

o achieve these and other aspects of the inventive concepts, as embodied and broadly described, a display device comprises: a display panel having a plurality of sub-pixels sharing a single reference voltage line, each of the sub-pixels comprising a switching transistor, a driving transistor, a sensing transistor, a storage capacitor, and a light-emitting element; a data driver configured to supply a data voltage to the plurality of sub-pixels; a gate driver configured to supply a gate signal to the plurality of sub-pixels; a timing controller configured to control the data driver and the gate driver; and a detector configured to sense a threshold voltage and mobility of the driving transistor to detect if there is a short-circuit between a gate electrode and an output terminal of the driving transistor.

In another aspect, a method for driving a display device comprises: sensing a threshold voltage of a driving transistor of each of a plurality of sub-pixels sharing a single reference voltage line; compensating for the threshold voltage of the driving transistor based on results of sensing the threshold voltage of the driving transistor; sensing mobility of the driving transistor; and determining whether there is a short-circuit between a gate electrode and an output terminal of the driving transistor based on results of sensing the threshold voltage and the mobility of the driving transistor.

Other detailed matters of the exemplary embodiments are included in the detailed description and the drawings.

According to an exemplary embodiment of the present disclosure, it is possible to detect if there is a short-circuit between a gate electrode and an output terminal of a driving transistor of a sub-pixel.

According to another exemplary embodiment of the present disclosure, it is possible to detect if there is a short-circuit between two electrodes of a storage capacitor of a sub-pixel.

According to an exemplary embodiment of the present disclosure, it is possible to address a sensing error which may occur in a structure where sub-pixels of a single pixel are connected to a single reference voltage line.

According to an exemplary embodiment of the present disclosure, it is possible to achieve the same effect as that obtained when a sensing signal is applied to the sensing transistor while no scan signal is applied to the switching transistor in a structure where a switching transistor and a sensing transistor of a sub-pixel receives the same signal from a single gate line.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
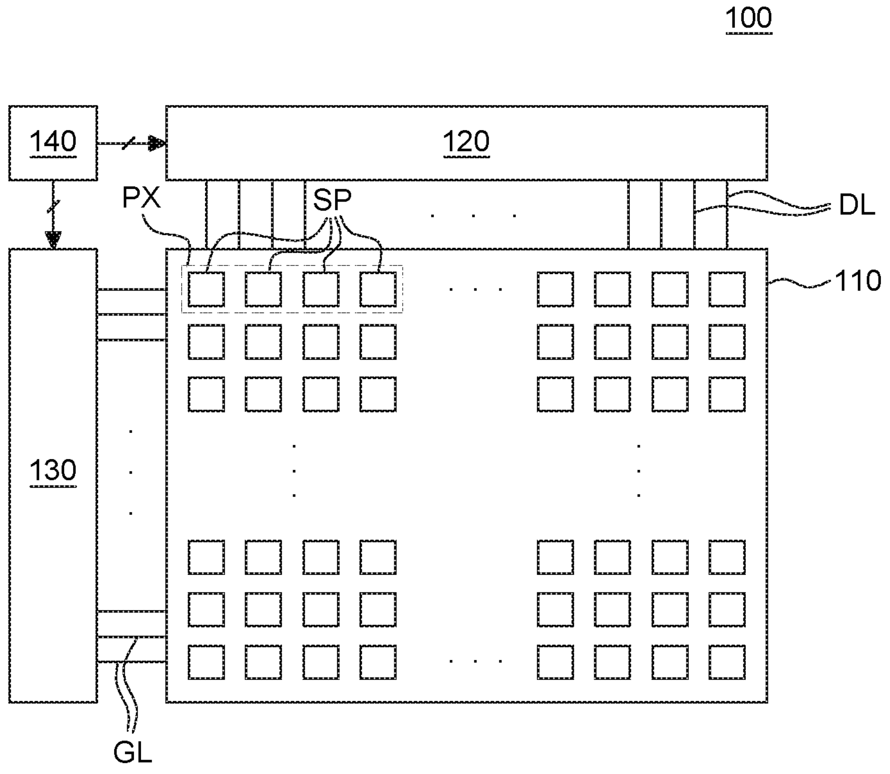
FIG. 1 is a view showing a display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Herein, transistors used in a display device may be implemented as one or more of n-channel transistors (NMOS) and p-channel transistors (PMOS). The transistors may be implemented as an oxide semiconductor transistor having an oxide semiconductor as an active layer or an LTPS transistor having a low-temperature poly-silicon (LTPS) as an active layer. Each of the transistors may include at least a gate electrode, a source electrode and a drain electrode. The transistors may be implemented as thin-film transistors (TFT) on the display panel. In the transistors, the carriers flow from the source electrode to the drain electrode. For an n-channel transistor (NMOS) where electrons are the carriers, the voltage at the source electrode is lower than the voltage at the drain electrode to allow the electrons to flow from the source electrode to the drain electrode. In a n-channel transistor NMOS, electric current flows from the drain electrode to the source electrode, and the source electrode may be an output terminal. For a p-channel transistor (PMOS) where holes are the carriers, the voltage at the source electrode is higher than the voltage at the drain electrode to allow the holes to flow from the source electrode to the drain electrode. In a p-channel transistor PMOS, as holes flow from the source electrode to the drain electrode, electric current flows from the source electrode to the drain electrode, and the drain electrode may be an output terminal. As such, it is to be noted that the source electrode and drain electrode of a transistor are not fixed but may be switched depending on the applied voltage. Herein, it is assumed that transistors are n-channel transistors (NMOS), but the present disclosure is not limited thereto. P-channel transistors may be employed and the circuit configuration may be altered accordingly.

For transistors used as switching elements, a gate signal swings between a gate-on voltage and a gate-off voltage. The gate-on voltage is set to a voltage higher than the threshold voltage Vth of a transistor, while the gate-off voltage is set to a voltage lower than the threshold voltage Vth of the transistor. The transistor is turned on in response to the gate-on voltage and is turned off in response to the gate-off voltage. For a NMOS transistor, the gate-on voltage may be a gate-high voltage (VGH), and the gate-off voltage may be a gate-low voltage (VGL). For a PMOS transistor, the gate-on voltage may be a gate-low voltage (VGL), and the gate-off voltage may be a gate-high voltage (VGH).

Hereinafter, exemplary embodiments of the present disclosure will be described in detail with reference to the accompanying drawings.

FIG. 1 is a view showing a display device according to an exemplary embodiment of the present disclosure. Referring to FIG. 1, a display device 100 includes a display panel 110, a gate driver 120, a data driver 130, and a timing controller 140.

The display panel 110 is a panel for displaying images. The display panel 110 may include a variety of circuits, lines, and light-emitting elements disposed on a substrate. The display panel 110 may include a plurality of pixels, each of which is defined by a plurality of data lines DL and a plurality of gate lines GL intersecting one another and is connected to the data lines DL and the gate lines GL. The display panel 110 may include a display area defined by the plurality of pixels PX and a non-display area where various signal lines, pads, etc. are formed. The display panel 110 may be implemented as a display panel used in various display devices such as a liquid-crystal display device, an organic light-emitting display device and an electrophoretic display device. In the following description, the display panel 110 is described as a panel used in an organic light-emitting display device. It is, however, to be understood that the present disclosure is not limited thereto.

The timing controller 140 receives timing signals such as a vertical synchronization signal, a horizontal synchronization signal, a data enable signal and a dot clock via a receiving circuit such as LVDS (Low Voltage Differential Signaling) and TMDS (Transition Minimized Differential Signaling) interfaces connected to a host system. The timing controller 140 generates timing control signals for controlling the data driver 130 and the gate driver 120 based on the received timing signals.

The data driver 130 supplies data voltage Vdata to a plurality of sub-pixels SP. The data driver 130 may include a plurality of source drive integrated circuits (ICs). The plurality of source drive ICs may receive digital video data RGB and a source timing control signal DDC from the timing controller 140. The source driver ICs may convert the digital video data RGB into a gamma voltage in response to a source timing control signal DDC to generate a data voltage Vdata, and may apply the data voltage Vdata via the data lines DL of the display panel 110. The source drive ICs may be connected to the data lines DL of the display panel 110 by a chip-on-glass (COG) process or a tape automated bonding (TAB) process. In addition, the source drive ICs may be formed on the display panel 110 or may be formed on a separate PCB and connected to the display panel 110.

The gate driver 120 supplies gate signals to the sub-pixels SP. The gate driver 120 may include a level shifter and a shift register. The level shifter may shift the level of a clock signal CLK input at the transistor-transistor-logic (TTL) level from the timing controller 140 and then may supply it to the shift register. The shift register may be formed in, but is not limited to, the non-display area of the display panel 110 by using a GIP technique. The shift register may include a plurality of stages for shifting gate signals to output them in response to the clock signal CLK and the driving signal. The plurality of stages included in the shift register may sequentially output gate signals through the plurality of output terminals.

The display panel 110 may include a plurality of sub-pixels SP. The plurality of sub-pixels SP may emit different colors. For example, the plurality of sub-pixels SP may include a first sub-pixel SP1, a second sub-pixel SP2, a third sub-pixel SP3 and a fourth sub-pixel SP4. The first sub-pixel SP1, the second sub-pixel SP2, the third sub-pixel SP3 and the fourth sub-pixel SP4 may be, but is not limited to, a red sub-pixel, a green sub-pixel, a blue sub-pixel, and a white sub-pixel, respectively. Such sub-pixels SP may form a pixel PX. Specifically, one first sub-pixel SP1, one second sub-pixel SP2, one third sub-pixel SP3 and one fourth sub-pixel SP4 may form a single pixel PX, and the display panel 110 may include a plurality of such pixels PX.

Hereinafter, a driver circuit for driving a single sub-pixel SP will be described in detail with reference to FIG. 2.

Figure 2:
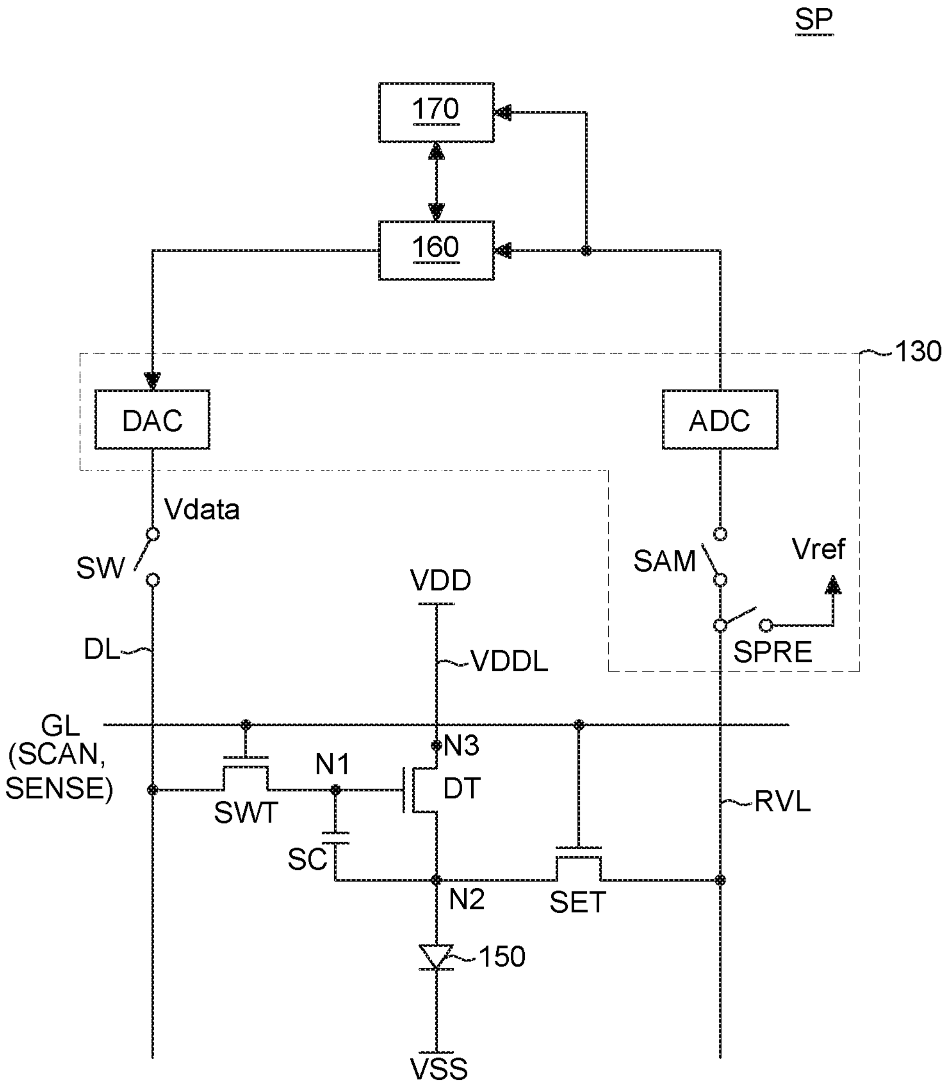
FIG. 2 is a circuit diagram of a sub-pixel of a display device according to an exemplary embodiment of the present disclosure.

FIG. 2 is a circuit diagram of a sub-pixel of a display device according to an exemplary embodiment of the present disclosure. FIG. 2 shows a circuit diagram of one of a plurality of sub-pixels SP of the display device 100.

Referring to FIG. 2, the sub-pixel SP may include a switching transistor SWT, a sensing transistor SET, a driving transistor DT, a storage capacitor SC, and a light-emitting element 150.

The light-emitting element 150 may include an anode, an organic layer, and a cathode. The organic layer may further include a variety of organic layers such as a hole injection layer, a hole transport layer, an organic emissive layer, an electron transport layer, and an electron injection layer. The anode of the light-emitting element 150 may be connected to the output terminal of the driving transistor DT, and a low-level voltage VSS may be applied to the cathode. Although an organic light-emitting element 150 is employed as the light-emitting element 150 in the example shown in FIG. 2, the present disclosure is not limited thereto. An inorganic light-emitting diode, i.e., an LED may also be used as the light-emitting element 150.

Referring to FIG. 2, the switching transistor SWT is a transistor for transferring the data voltage Vdata to a first node N1 corresponding to the gate electrode of the driving transistor DT. The switching transistor SWT may include a drain electrode connected to the data line DL, a gate electrode connected to the gate line GL, and a source electrode connected to the gate electrode of the driving transistor DT. The switching transistor SWT may be turned on by a scan signal SCAN applied from the gate line to transfer the data voltage Vdata supplied from the data line DL to the gate electrode of the driving transistor DT.

Referring to FIG. 2, the driving transistor DT is a transistor for driving the light-emitting element 150 by supplying a driving current to the light-emitting element 150. The driving transistor DT may include a gate electrode associated with the first node N1, a source electrode associated with the second node N2 and working as the output terminal, and a drain electrode associated with the third node N3 and working as the input terminal. The gate electrode of the driving transistor DT may be connected to the switching transistor SWT, the drain electrode may receive a high-level voltage VDD through a high-level voltage line VDDL, and the source electrode may be connected to the anode of the light-emitting element 150.

Referring to FIG. 2, the storage capacitor SC is a capacitor for holding a voltage equal to the data voltage Vdata for one frame. One electrode of the storage capacitor SC may be connected to the first node N1, and the other electrode of the storage capacitor SC may be connected to the second node N2.

Incidentally, as the driving time of each sub-pixel SP in the display device 100 increases, the circuit elements such as the driving transistor DT may be degraded. As a result, the characteristic values of the circuit elements such as the driving transistor DT may be changed. The characteristic values of the circuit elements may include the threshold voltage Vth of the driving transistor DT, the mobility α of the driving transistor DT, etc. Such change in the characteristic values of the circuit elements may cause a change in luminance of the respective sub-pixel SP. Therefore, a change in the characteristic values of the circuit elements may be regarded as a change in luminance of the sub-pixel SP.

In addition, the degree of the change in characteristic values of the circuit elements of each of the sub-pixels SP may be different depending on the degree of degradation of the circuit elements. Such difference in the degree of change in the characteristic values between the circuit elements may cause deviations in luminance between the sub-pixels SP. Therefore, deviations in the characteristic values of the circuit elements may be regarded as deviations in luminance of the sub-pixel SP. A change in the characteristic values of the circuit elements, that is, a change in the luminance of the sub-pixel SP and deviations in the characteristic values between the circuit elements, that is, deviations in the luminance between the sub-pixels SP may lower the accuracy of the luminance represented by the sub-pixels SP or may generate defects on the images.

In view of the above, the sub-pixel SP of the display device 100 according to an exemplary embodiment of the present disclosure can provide a feature of sensing the characteristic values of the sub-pixel SP, and a feature of compensating for the characteristic values of the sub-pixel SP based on the results of the sensing.

To this end, as shown in FIG. 2, the sub-pixel SP may further include a sensing transistor SET for effectively controlling the voltage status at the source electrode of the driving transistor DT, in addition to the switching transistor SWT, the driving transistor DT, the storage capacitor SC and the light-emitting element 150.

Referring to FIG. 2, the sensing transistor SET is connected between the source electrode of the driving transistor DT and a reference voltage line RVL for supplying a reference voltage Vref, and its gate electrode is connected to the gate line GL. Accordingly, the sensing transistor SET may be turned on by a sensing signal SENSE applied through the gate line GL to apply the reference voltage Vref supplied through the reference voltage line RVL to the source electrode of the driving transistor DT. In addition, the sensing transistor SET may be utilized as one of voltage sensing paths for the source electrode of the driving transistor DT.

Referring to FIG. 2, the switching transistor SWT and the sensing transistor SET of the sub-pixel SP may share the single gate line GL. That is to say, the switching transistor SWT and the sensing transistor SET may receive the same gate signal applied from the same gate line GL. Although the gate signal applied to the gate electrode of the switching transistor SWT is referred to as a scan signal SCAN while the gate signal applied to the gate electrode of the sensing transistor SET is referred to as a sensing signal SENSE for convenience of illustration, it is to be understood that the scan signal SCAN and the sensing signal SENSE applied to one sub-pixel SP are the same signal transferred from the same gate line GL.

Referring to FIG. 2, the display device 100 may include an analog-to-digital converter ADC that generates sensing data by voltage sensing to determine characteristic values of the driving transistor DT and outputs it; a compensator 160 that determines the characteristic values of the driving transistor DT by using the sensing data output from the analog-to-digital converter ADC and performs a compensation process to compensate for the characteristic values of the driving transistor DT; a digital-to-analog converter DAC that converts data voltage Vdata into a digital value to output it; and a detector 170 that senses the threshold voltage Vth and the mobility α of the driving transistor DT and detects if there is a short-circuit between the gate electrode and the output terminal, i.e., the source electrode of the driving transistor DT. In addition, although not shown in FIG. 2, the sub-pixel may further include a memory for storing sensing data and a compensation value calculated based on the compensation processing results. The analog-to-digital converter ADC and the digital-to-analog converter DAC may be included in the data driver 130, but the present disclosure is not limited thereto. In addition, the compensator 160 and the detector 170 may be included in the timing controller 140, but the present disclosure is not limited thereto.

Referring to FIG. 2, the data driver 130 may include an initializing switch SPRE that controls whether to apply a reference voltage line Vref to a reference voltage line RVL, and a sampling switch SAM that controls whether to connect between the reference voltage line RVL and the analog-to-digital converter ADC. It is, however, to be understood that the present disclosure is not limited thereto. The initializing switch SPRE and the sampling switch SAM may be located outside the data driver 130.

The initializing switch SPRE is a switch that controls application of voltage at the source electrode of the driving transistor DT in the sub-pixel SP so that the source electrode of the driving transistor DT reflects the desired characteristic values of the circuit elements, i.e., the characteristic values of the driving transistor DT. When the initializing switch SPRE is turned on, the initializing switch SPRE may be connected to the reference voltage line RVL to apply the reference voltage Vref to the sensing transistor SET. Accordingly, the reference voltage Vref may be applied to the source electrode of the driving transistor DT through the turned-on sensing transistor SET.

When the sampling switch SAM is turned on, it connects the reference voltage line RVL with the analog-to-digital converter ADC. In order to transfer the voltage from the sensing transistor SET to the compensator 160, the on-off timing of the sampling switch SAM may be controlled so that it is turned on when the source electrode of the driving transistor DT reflects desired characteristic values of the circuit elements. When the sampling switch SAM is turned on, the analog-to-digital converter ADC may sense the voltage of the connected reference voltage line RVL.

When the analog-to-digital converter ADC senses the voltage of the reference voltage line RVL, if the sensing transistor SET is turned on and the resistance component of the driving transistor DT is ignorable, the voltage sensed by the analog-to-digital converter ADC may be equal to the voltage at the source electrode of the driving transistor DT. For example, the voltage sensed by the analog-to-digital converter ADC may be, but is not limited to, a voltage for sensing the threshold voltage Vth of the driving transistor DT or the mobility α of the driving transistor DT.

The compensator 160 may change the image data via the process of compensating the threshold voltage Vth of the driving transistor DT or the mobility α of the driving transistor DT to supply the changed data to the data driver 130. Accordingly, the data driver 130 converts the changed data into a data voltage Vdata by the digital-to-analog converter DAC and supplies it to the respective sub-pixel SP, thereby performing the compensation process.

The detector 170 can detect if there is a short-circuit between the gate electrode and the output terminal, i.e., the source electrode of the driving transistor DT based on the results of sensing the threshold voltage Vth and the mobility of the driving transistor DT. In other words, the detector 170 can detect if there is a short-circuit between the two electrodes of the storage capacitor SC. The detector 170 will be described in more detail later with reference to FIGS. 4 to 7B.

Referring to FIG. 2, a switch SW may be disposed between the data driver 130 and the data line DL. Specifically, a plurality of switches SW may be disposed between the data driver 130 and the data lines DL that transfer data voltage Vdata from the data driver 130 to the sub-pixels SP, to switch electrical connection between the data driver 130 and the data lines DL. When the switch SW is turned on, the data driver 130 is connected to the data line DL, and when the switch SW is turned off, the data driver 130 is not connected to the data line DL. Accordingly, when the switch SW is turned off, no voltage is applied to the drain electrode of the switching transistor SWT, so that the same effect can be achieved as that obtained when the gate electrode of the driving transistor DT is floating.

Hereinafter, an arrangement relationship between a plurality of sub-pixels SP and a reference voltage line RVL will be described with reference to FIG. 3.

Figure 3:
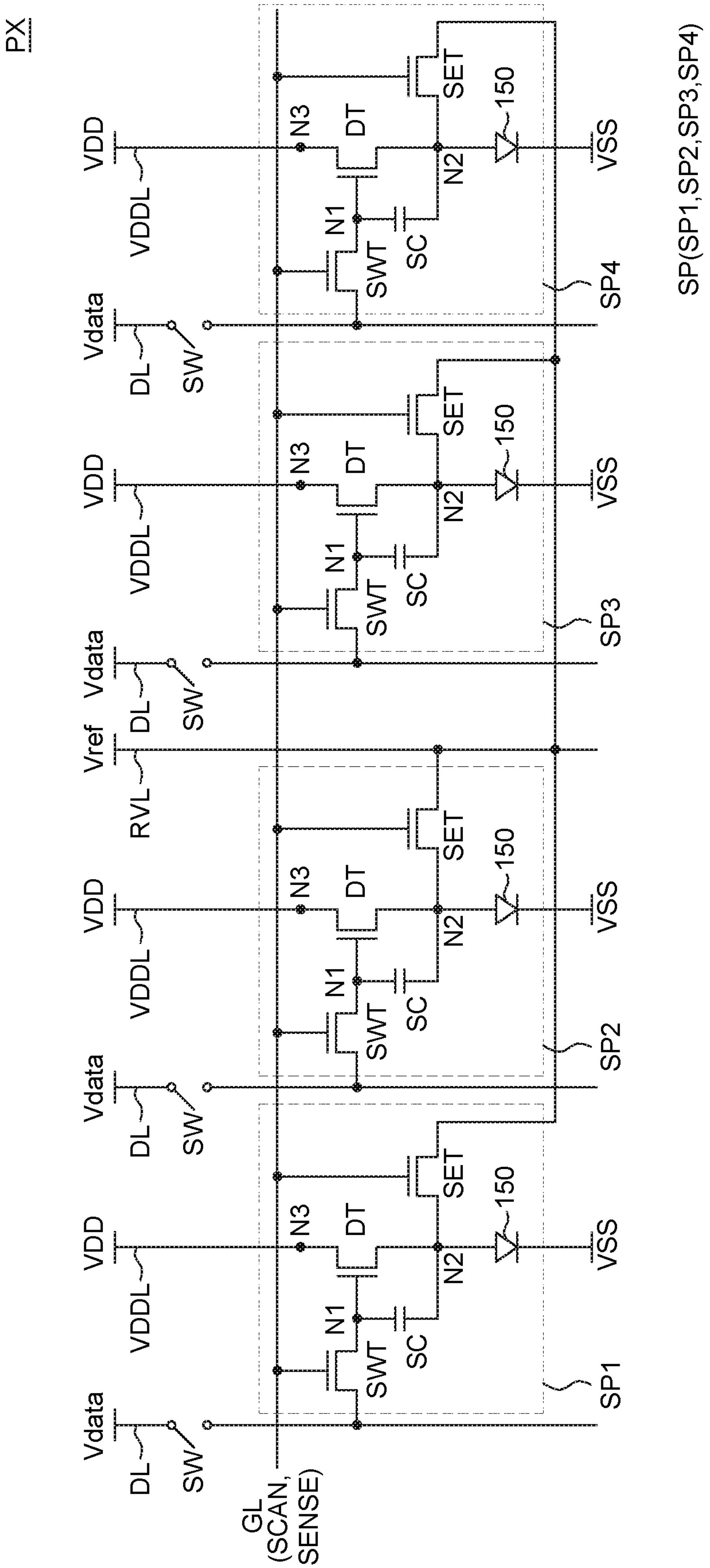
FIG. 3 is a circuit diagram of a sub-pixel including four sub-pixels in a display device according to an exemplary embodiment of the present disclosure.

FIG. 3 is a circuit diagram of a single pixel PX including four sub-pixels SP of a display device according to an exemplary embodiment of the present disclosure.

Referring to FIG. 3, the single pixel PX includes four sub-pixels SP. For example, the pixel PX may include a first sub-pixel SP1, a second sub-pixel SP2, a third sub-pixel SP3 and a fourth sub-pixel SP4 as shown in FIG. 3. The first sub-pixel SP1, the second sub-pixel SP2, the third sub-pixel SP3 and the fourth sub-pixel SP4 may be, but is not limited to, a red sub-pixel, a green sub-pixel, a blue sub-pixel, and a white sub-pixel, respectively.

Referring to FIG. 3, the first sub-pixel SP1, the second sub-pixel SP2, the third sub-pixel SP3 and the fourth sub-pixel SP4 share one reference voltage line RVL. That is to say, the sensing transistor SET of the first sub-pixel SP1, the sensing transistor SET of the second sub-pixel SP2, the sensing transistor SET of the third sub-pixel SP3, and the sensing transistor SET of the fourth sub-pixel SP4 all may be connected to the single reference voltage line RVL. In the display device 100 according to the exemplary embodiment of the present disclosure, the number of reference voltage lines RVL is reduced so as to simplify the design of the display device 100 and increase the aperture ratio.

Although all of the first sub-pixel SP1, the second sub-pixel SP2, the third sub-pixel SP3 and the fourth sub-pixel SP4 share the single reference voltage line RVL in the example shown in FIG. 3, the present disclosure is not limited thereto. Depending on the design of the display panel 110, two sub-pixels SP may share one reference voltage line RVL, three sub-pixels SP may share one reference voltage line RVL, and five or more sub-pixels SP mat share one reference voltage line RVL.

In the display device 100 according to an exemplary embodiment of the present disclosure, the first sub-pixel SP1, the second sub-pixel SP2, the third sub-pixel SP3 and the fourth sub-pixel SP4 share the single reference voltage line RVL. That is to say, the sensing transistor SET of the first sub-pixel SP1, the sensing transistor SET of the second sub-pixel SP2, the sensing transistor SET of the third sub-pixel SP3, and the sensing transistor SET of the fourth sub-pixel SP4 all may be connected to the single reference voltage line RVL. Therefore, when one of the sub-pixels SP is a defective sub-pixel in which a short-circuit is formed between the gate electrode and the source electrode of the driving transistor DT, an error may occur in sensing the other sub-pixels SP sharing the reference voltage line RVL. Accordingly, it is necessary to accurately detect a defective sub-pixel having a short-circuit between the gate electrode and the source electrode of the driving transistor DT.

Hereinafter, in the display device 100 and the method for driving the display device according to an exemplary embodiment of the present disclosure, the detector 170 for detecting a defective sub-pixel in which a short-circuit is formed between the gate electrode and the source electrode of the driving transistor DT will be described in more detail with reference to FIGS. 4 to 7B.

Figure 4:
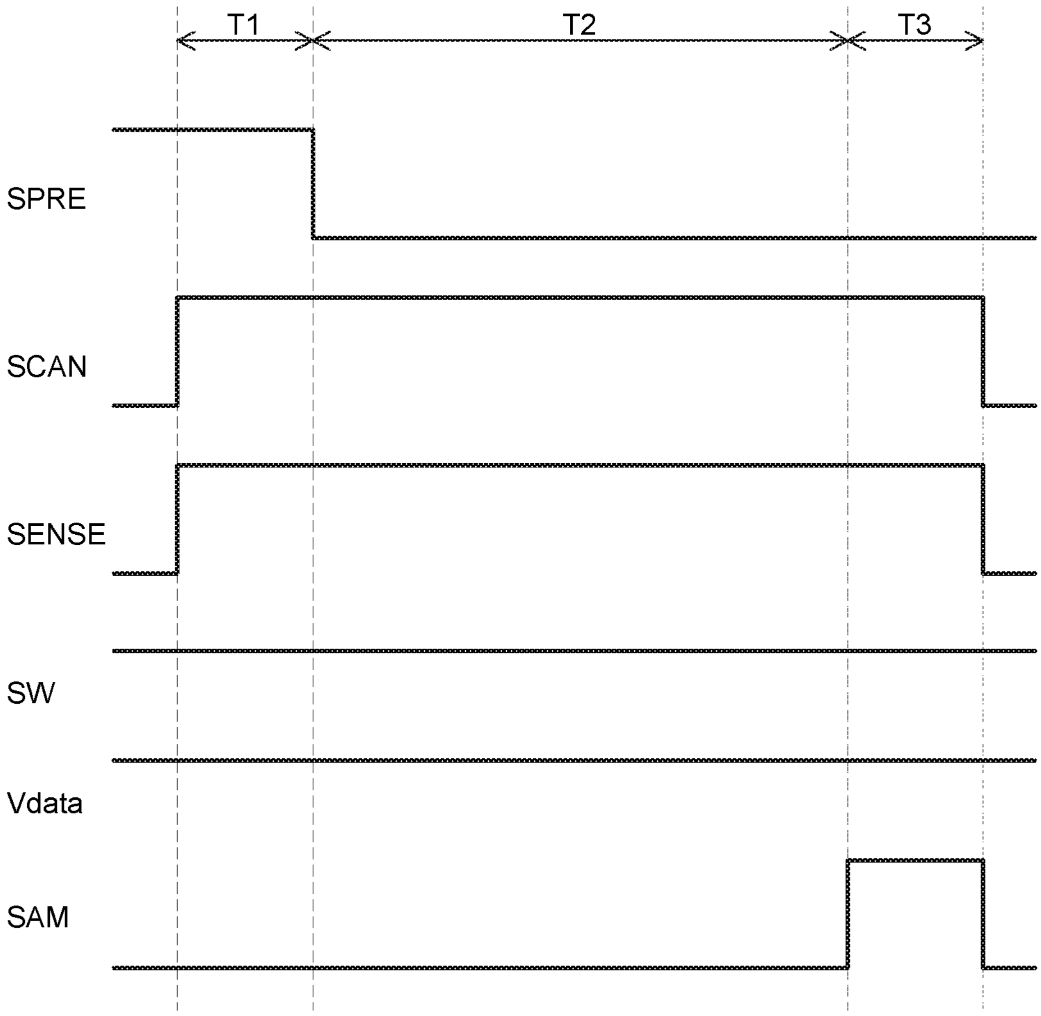
FIG. 4 is a waveform diagram illustrating a display device and a method for driving the display device according to an exemplary embodiment of the present disclosure.
Figure 5A:
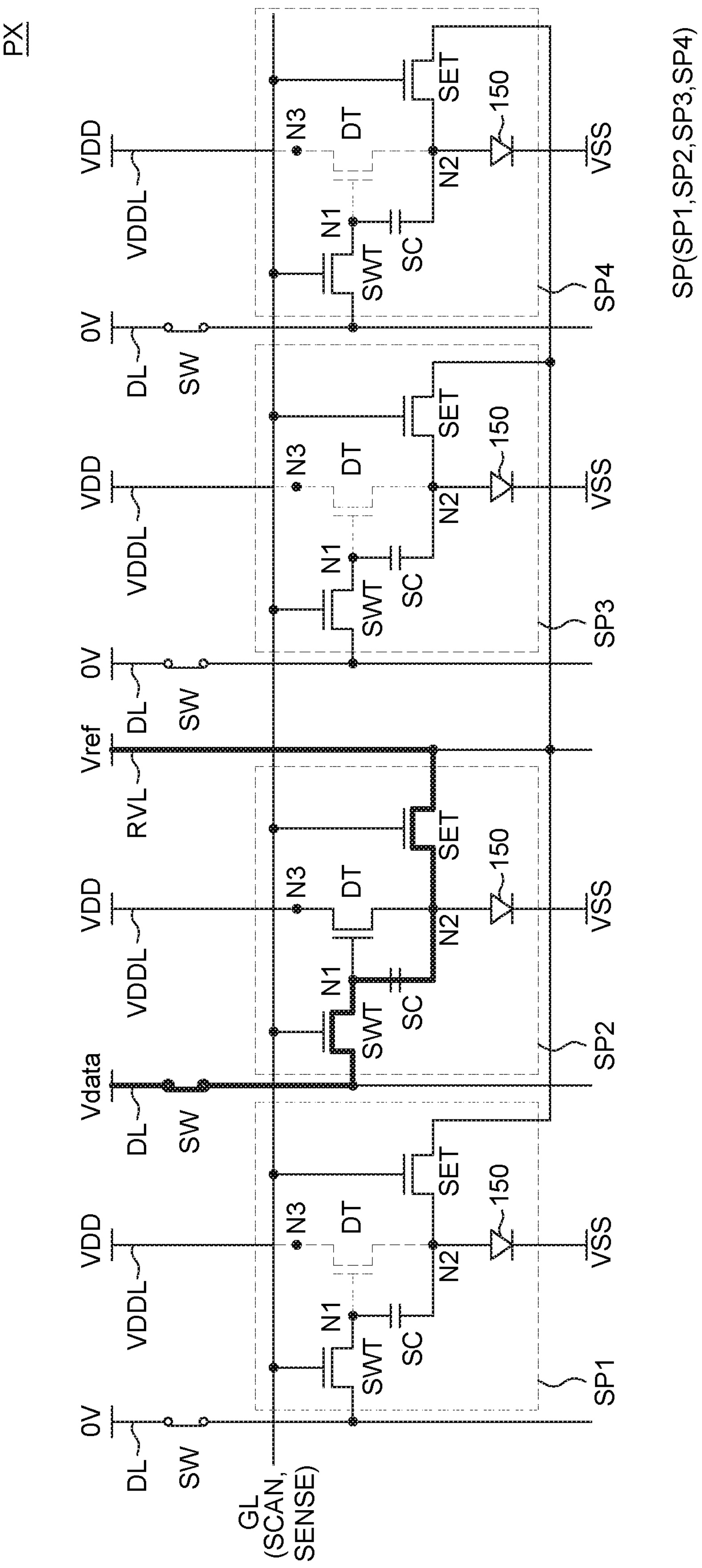
FIGS. 5A and 5B are circuit diagrams illustrating a process of detecting a normal sub-pixel and a defective sub-pixel in a display device and a method for driving the display device according to an exemplary embodiment of the present disclosure.
Figure 5B:
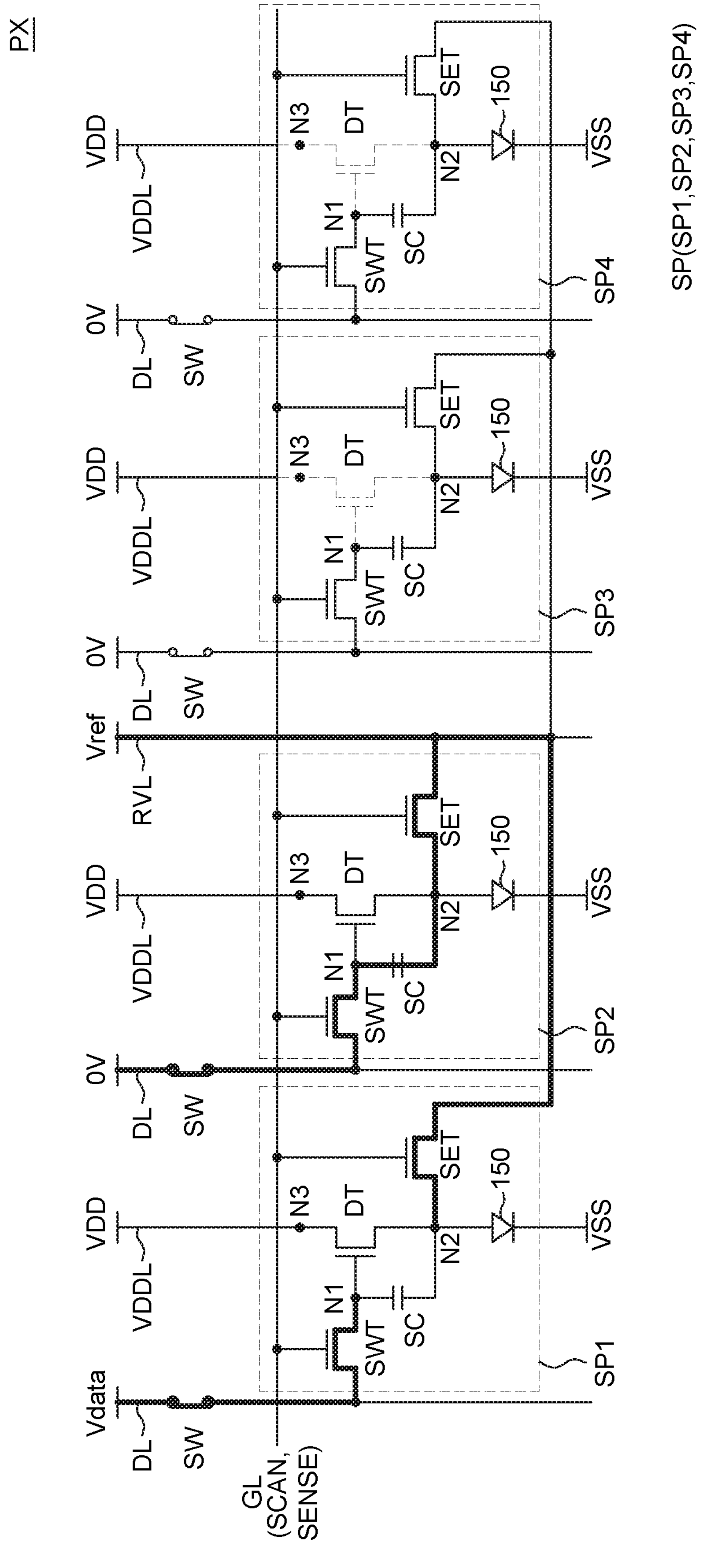

FIG. 4 is a waveform diagram for illustrating a display device and a method for driving the display device according to an exemplary embodiment of the present disclosure. FIGS. 5A and 5B are circuit diagrams illustrating a process of detecting a normal sub-pixel and a defective sub-pixel in a display device and a method for driving the display device according to an exemplary embodiment of the present disclosure. FIG. 4 is a waveform diagram for illustrating a process of sensing a threshold voltage Vth of a driving transistor DT of a single sub-pixel SP. In the example shown in FIGS. 5A and 5B, the second sub-pixel SP2 is a defective sub-pixel having a short-circuit between the gate electrode and the source electrode of the driving transistor DT, while the first sub-pixel SP1, the third sub-pixel SP3 and the fourth sub-pixel SP4 are normal sub-pixels having no short-circuit between the gate electrode and the source electrode of the driving transistor DT. FIG. 5A is a circuit diagram for illustrating a process of sensing the threshold voltage Vth of the driving transistor DT of the defective second sub-pixel SP2. FIG. 5B is a circuit diagram for illustrating a process of sensing the threshold voltage Vth of the driving transistor DT of the normal first sub-pixel SP1. FIGS. 5A and 5B are circuit diagrams during a third time period T3.

Referring initially to FIG. 4, a process of sensing the threshold voltage Vth of the driving transistor will be described. The way of sensing the threshold voltage Vth shown in FIG. 4 is also referred to as a source follower topology.

During a first time period T1, the initializing switch SPRE is turned on and the sampling switch SAM is turned off, such that the gate driver 120 applies a gate-high voltage that is a turn-on signal to the sensing transistor SET and the switching transistor SWT through the gate line GL. As a result, both the switching transistor SWT and the sensing transistor SET are turned on by the scan signal SCAN and the sensing signal SENSE. Accordingly, as the initializing switch SPRE is turned on, the reference voltage Vref may be supplied to the reference voltage line RVL and applied to the source electrode of the driving transistor DT through the turned-on sensing transistor SET. In addition, the data voltage Vdata from the data driver 130 may be applied to the switching transistor SWT through the data line DL, and the data voltage Vdata may be applied to the gate electrode of the driving transistor DT through the turned-on switching transistor SWT.

Subsequently, during a second time period T2, the initializing switch SPRE is turned off, such that the source electrode of the driving transistor DT is floating. That is to say, the application of the reference voltage Vref to the sensing transistor SET is cut off by the initializing switch SPRE. Accordingly, the voltage at the source electrode of the driving transistor DT rises. The voltage at the source electrode of the driving transistor DT is increased for a certain period of time, and the increase rate is gradually reduced till the voltage is saturated. The saturated voltage at the source electrode of the driving transistor DT may be equal to the difference between the data voltage Vdata and the threshold voltage Vth.

When the voltage at the source electrode of the driving transistor DT is saturated, the sampling switch SAM is turned on during the third time period T3. As the sampling switch SAM is turned on, the sensing transistor SET is connected to the analog-to-digital converter ADC through the reference voltage line RVL. Accordingly, the saturated voltage at the source electrode of the driving transistor DT is provided to the compensator 160 and the detector 170 through the sampling switch SAM and the analog-to-digital converter ADC. Accordingly, the compensator 160 senses the saturated voltage at the source electrode of the driving transistor DT. The voltage sensed by the compensator 160 may be equal to a voltage obtained by subtracting the threshold voltage Vth from the data voltage Vdata (Vdata-Vth).

Referring to FIG. 5A, to sense the threshold voltage Vth of the second sub-pixel SP2, the data voltage Vdata is applied to the second sub-pixel SP2 through the data line DL, while the data voltage Vdata may not be applied to the first sub-pixel SP1, the third sub-pixel SP3 and the fourth sub-pixel SP4, but 0V may be applied to them. As a result, the driving transistors DT of the first sub-pixel SP1, the third sub-pixel SP3 and the fourth sub-pixel SP4 are all turned off, and no signal is transferred to the reference voltage line RVL from the first sub-pixel SP1, the third sub-pixel SP3 and the fourth sub-pixel SP4. In contrast, since there is a short-circuit formed between the gate electrode and the source electrode of the driving transistor DT, that is, the both electrodes of the storage capacitor SC are connected with each other in the second sub-pixel SP2, the data voltage Vdata is transferred to the reference voltage line RVL as it is during the third time period T3. Accordingly, it may be sensed that the second sub-pixel SP2 is a defective sub-pixel or a normal sub-pixel.

Next, referring to FIG. 5B to sense the threshold voltage Vth of the first sub-pixel SP1, the data voltage Vdata is applied to the first sub-pixel SP1 through the data line DL, while the data voltage Vdata may not be applied to the second sub-pixel SP2, the third sub-pixel SP3 and the fourth sub-pixel SP4, but 0V may be applied to them. As a result, the driving transistors DT of the third sub-pixel SP3 and the fourth sub-pixel SP4 are all turned off, and no signal is transferred to the reference voltage line RVL from the third sub-pixel SP3 and the fourth sub-pixel SP4. Incidentally, since the data voltage Vdata is not applied but 0V is applied to the driving transistor DT of the second sub-pixel SP2, the driving transistor DT is to be turned off. However, since there is a short-circuit formed between the gate electrode and the source electrode of the driving transistor DT of the second sub-pixel SP2, that is, a short-circuit is formed between the both electrodes of the storage capacitor SC, a voltage close to 0V, i.e., an underflow voltage may be transferred to the reference voltage line RVL as it is during the third time period T3. As a result, the first sub-pixel SP1, which is a normal sub-pixel, may be sensed as a defective sub-pixel due to the second sub-pixel SP2. Similarly, when the threshold voltage Vth of each of the third sub-pixel SP3 and the fourth sub-pixel SP4 is sensed, which are normal sub-pixels, they may be sensed as defective sub-pixels due to the second sub-pixel SP2, which is a defective sub-pixel.

To recapitulate, during the process of sensing the threshold voltages Vth of the driving transistors DT, a defective sub-pixel having a short-circuit between the gate electrode and the source electrode of the driving transistor DT may be sensed as a normal sub-pixel, whereas a normal sub-pixel having no short-circuit between the gate electrode and the source electrode of the driving transistor DT may be sensed as a defective sub-pixel.

The detector 170 may sense the threshold voltage Vth of the driving transistor DT based on the source follower topology described above with reference to FIG. 4 and may store the sensing results therein or in a memory.

The compensator 160 identifies the threshold voltage Vth or a change in the threshold voltage Vth of the driving transistor DT in the sub-pixel SP based on the provided sensing signal SENSE, and may perform the process of compensating for the threshold voltage Vth. Accordingly, the compensated data voltage Vdata may be output to the data line DL through the digital-to-analog converter DAC.

Figure 6:
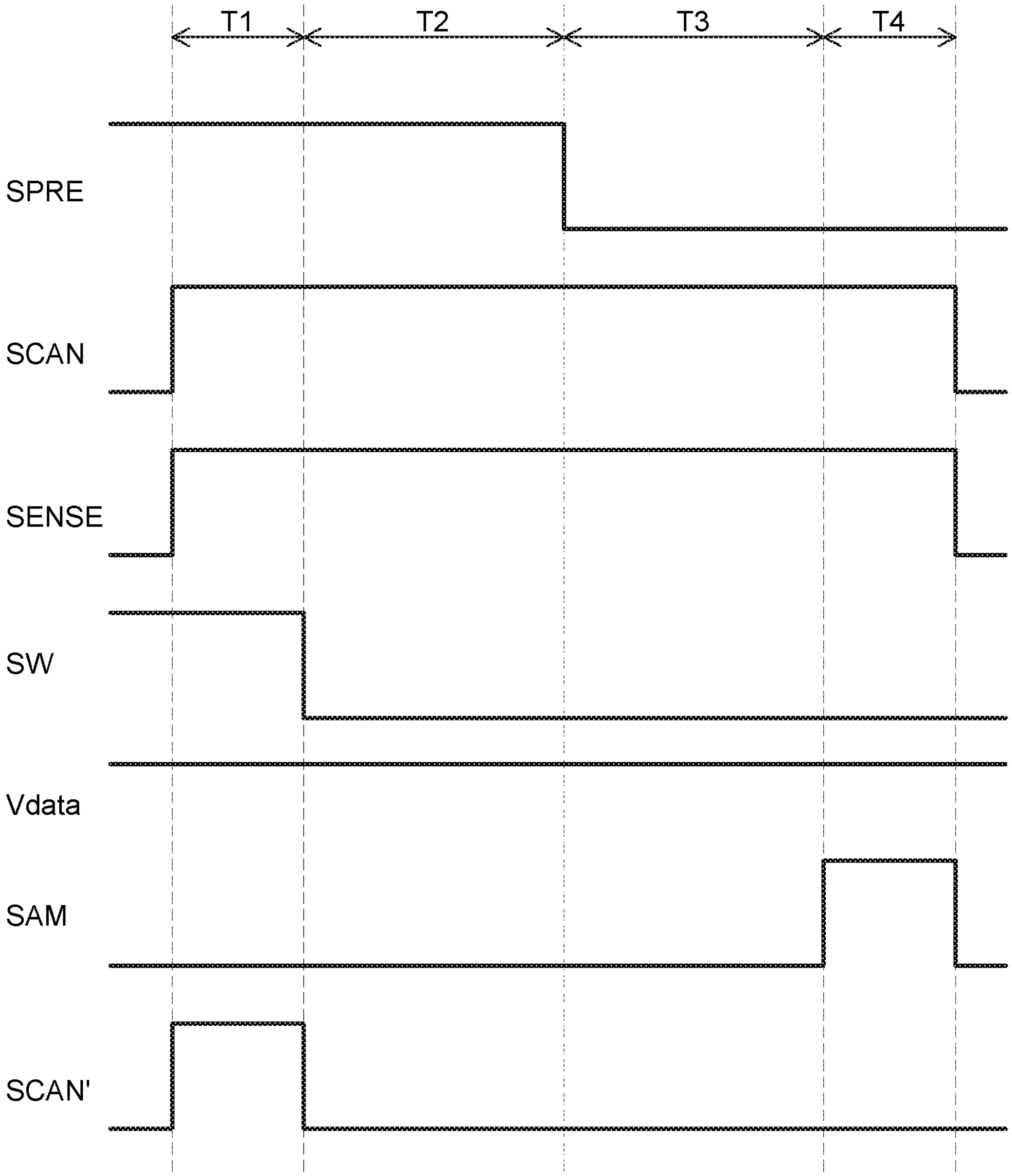
FIG. 6 is a waveform diagram for illustrating a display device and a method for driving the display device according to an exemplary embodiment of the present disclosure.
Figure 7A:
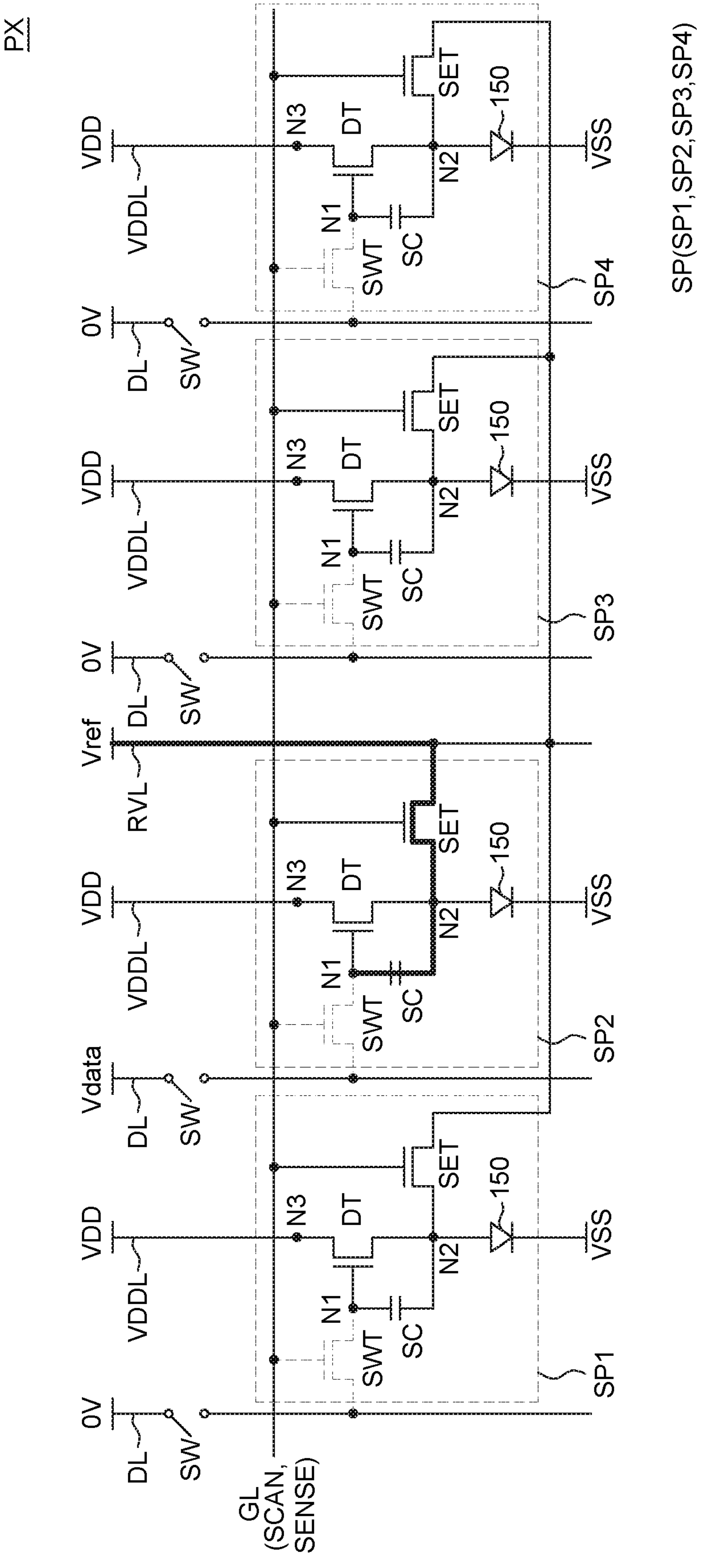
FIGS. 7A and 7B are circuit diagrams illustrating a process of detecting a normal sub-pixel and a defective sub-pixel in a display device and a method for driving the display device according to an exemplary embodiment of the present disclosure.
Figure 7B:
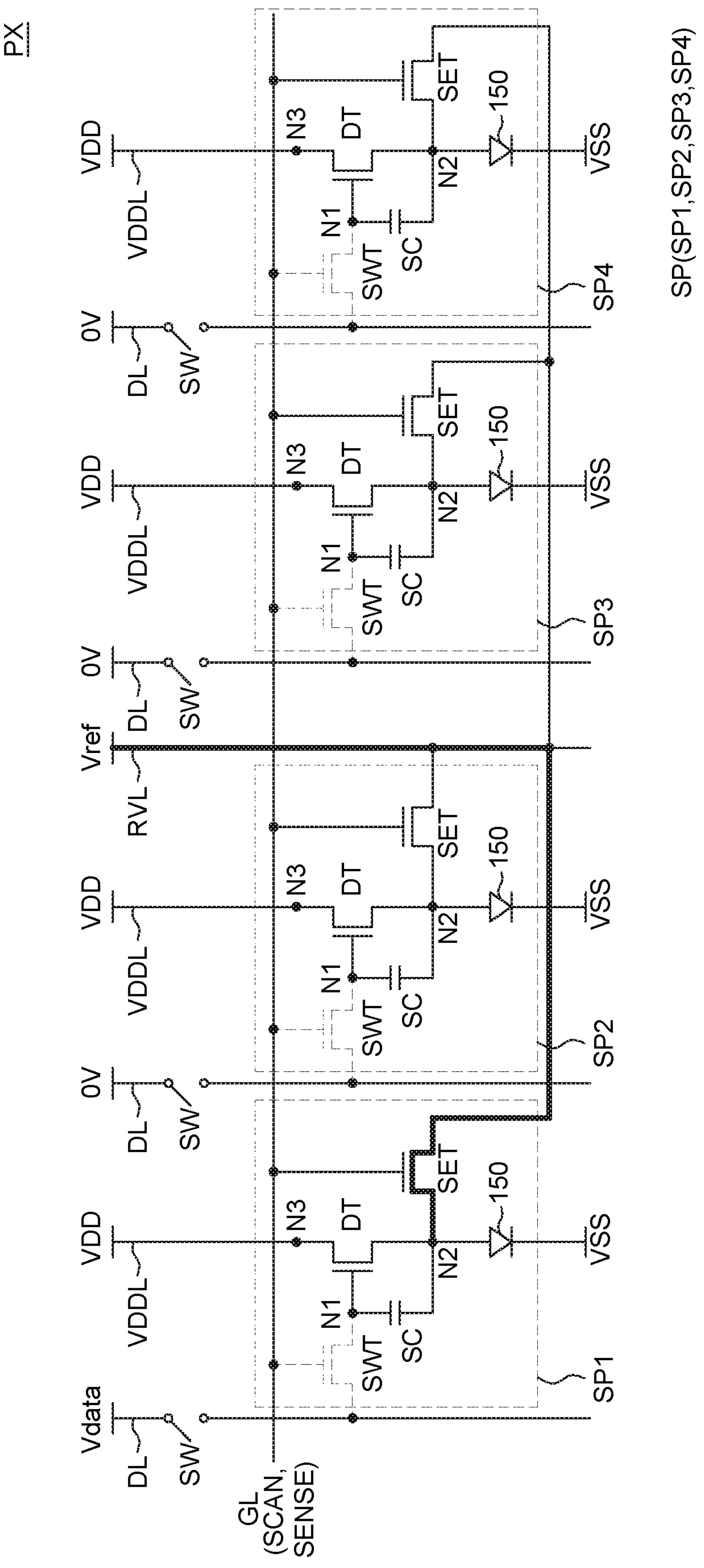

FIG. 6 is a waveform diagram for illustrating a display device and a method for driving the display device according to an exemplary embodiment of the present disclosure. FIGS. 7A and 7B are circuit diagrams illustrating a process of detecting a normal sub-pixel and a defective sub-pixel in a display device and a method for driving the display device according to an exemplary embodiment of the present disclosure. FIG. 6 is a waveform diagram for illustrating a process of sensing mobility α of a driving transistor DT of a sub-pixel SP. In the example shown in FIGS. 7A and 7B, the second sub-pixel SP2 is a defective sub-pixel having a short-circuit between the gate electrode and the source electrode of the driving transistor DT, while the first sub-pixel SP1, the third sub-pixel SP3 and the fourth sub-pixel SP4 are normal sub-pixels having no short-circuit between the gate electrode and the source electrode of the driving transistor DT. FIG. 7A is a circuit diagram for illustrating a process for sensing the mobility α of the driving transistor DT of the second sub-pixel SP2 which is a defective sub-pixel. FIG. 7B is a circuit diagram for illustrating a process for sensing the mobility α of the driving transistor DT of the first sub-pixel SP1 which is a normal sub-pixel. FIGS. 7A and 7B are circuit diagrams during a fourth time period T4.

Referring initially to FIG. 6, a process of sensing the mobility α of the driving transistor DT will be described.

During a first time period T1, the initializing switch SPRE is turned on and the sampling switch SAM is turned off, such that the gate driver 120 applies a gate-high voltage that is a turn-on signal to the sensing transistor SET and the switching transistor SWT through the gate line GL. As a result, both the switching transistor SWT and the sensing transistor SET are turned on by the scan signal SCAN and the sensing signal SENSE. Accordingly, as the initializing switch SPRE is turned on, the reference voltage Vref may be supplied to the reference voltage line RVL and applied to the source electrode of the driving transistor DT through the turned-on sensing transistor SET. In addition, the data voltage Vdata from the data driver 130 may be applied to the switching transistor SWT through the data line DL, and the data voltage Vdata may be applied to the gate electrode of the driving transistor DT through the turned-on switching transistor SWT.

Subsequently, a switch SW is turned off during a second time period T2. As a result, the electrical connection between the data driver 130 and the data line DL is removed. As the switch SW is turned off, the drain electrode of the switching transistor SWT is floating, and thus the same effect is achieved as that obtained when the switching transistor SWT is turned off. Specifically, even though the scan signal SCAN is also supplied to the gate electrode of the switching transistor SWT sharing the same gate line GL as a gate-high voltage due to the gate signal supplied to turn on the sensing transistor SET, by turning off the switch SW, the same effect can be achieved as that obtained when the gate electrode of the driving transistor DT is floating. Accordingly, as shown in FIG. 6, although the scan signal SCAN applied to the switching transistor SWT is actually the gate-high voltage during the second time period T2, the third time period T3 and the fourth time period T4, by turning off the switch SW, the scan signal SCAN applied to the switching transistor SWT is converted into a signal SCAN' shown in FIG. 6, and thus it may be regarded as the gate-low voltage during the second time period T2, the third time period T3 and the fourth time period T4.

Subsequently, during a third time period T3, the initializing switch SPRE is turned off, such that the source electrode of the driving transistor DT is floating. That is to say, the application of the reference voltage Vref to the sensing transistor SET is cut off by the initializing switch SPRE. Accordingly, the voltage at the source electrode of the driving transistor DT rises. The increase rate of the voltage at the source electrode of the driving transistor DT refers to the current capability of the driving transistor DT, i.e., the mobility α. Therefore, the greater the mobility α of a driving transistor DT is, the steeper the voltage at the source electrode of the driving transistor DT increases. The increase rate of the voltage at the source electrode of the driving transistor DT may be defined as a voltage change amount over time.

When a certain period of time elapses since the source electrode of the driving transistor DT is floating, the sampling switch SAM is turned on during the fourth time period T4. As the sampling switch SAM is turned on, the sensing transistor SET is connected to the analog-to-digital converter ADC through the reference voltage line RVL. Accordingly, the increased voltage at the source electrode of the driving transistor DT is provided to the compensator 160 and the detector 170 through the sampling switch SAM and the analog-to-digital converter ADC during the fourth time period T4. Accordingly, the compensator 160 senses the voltage at the source electrode of the driving transistor DT.

Referring to FIG. 7A, when the mobility α of the second sub-pixel SP2 is sensed, as the switch SW is turned off, the switching transistors SWT of the first sub-pixel SP1, the second sub-pixel SP2, the third sub-pixel SP3 and the fourth sub-pixel SP4 are all become as if they are turned off. At this time, since the switching transistor SWT is turned off, it may be sensed that the second sub-pixel SP2 is a defective sub-pixel which has a short-circuit between the gate electrode and the source electrode of the driving transistor DT.

Subsequently, referring to FIG. 7B, when the mobility α of the first sub-pixel SP1 is sensed, as the switch SW is turned off, the switching transistors SWT of the first sub-pixel SP1, the second sub-pixel SP2, the third sub-pixel SP3 and the fourth sub-pixel SP4 are all become as if they are turned off. At this time, since the switching transistor SWT is turned off, it may be sensed that the first sub-pixel SP1 is a normal sub-pixel which has no short-circuit between the gate electrode and the source electrode of the driving transistor DT.

To recapitulate, during the process of sensing the mobility α of the driving transistors DT, a defective sub-pixel having a short-circuit between the gate electrode and the source electrode of the driving transistor DT may be sensed as a defective sub-pixel, whereas a normal sub-pixel having no short-circuit between the gate electrode and the source electrode of the driving transistor DT may be sensed as a normal sub-pixel.

As described above, the detector 170 may sense the mobility α of the driving transistor DT and may store the sensing results therein or in a memory.

The detector 170 may sense the threshold voltage Vth and the mobility α of the driving transistor DT of each of the plurality of sub-pixels SP sharing the single reference voltage line RVL, to thereby detect if there is a short-circuit between the gate electrode and the output terminal of the driving transistor DT. For example, the detector 170 may sense the threshold voltage Vth of the driving transistor DT of each of the plurality of sub-pixels SP, and may sense the mobility α of the driving transistor DT in which the threshold voltage Vth is compensated, to thereby detect a sub-pixel SP in which a short-circuit is formed between the gate electrode and the output terminal of the driving transistor DT.

For example, when the first sub-pixel SP1 and the second sub-pixel SP2 share one reference voltage line RVL, if it is detected that the first sub-pixel SP1 is a defective sub-pixel and the second sub-pixel SP2 is a normal sub-pixel as a result of sensing the threshold voltage Vth of the driving transistor DT, and that the first sub-pixel SP1 is a normal sub-pixel and the second sub-pixel SP2 is a defective sub-pixel as a result of sensing the mobility α of the driving transistor DT, it may be determined that there is a short-circuit between the gate electrode and the output terminal of the driving transistor DT of the second sub-pixel SP2.

For example, when the first sub-pixel SP1, the second sub-pixel SP2, the third sub-pixel SP3 and the fourth sub-pixel SP4 share one reference voltage line RVL, if it is detected that the first sub-pixel SP1, the third sub-pixel SP3 and the fourth sub-pixel SP4 are defective sub-pixels and the second sub-pixel SP2 is a normal sub-pixel as a result of sensing the threshold voltage Vth of the driving transistor DT, and that the first sub-pixel SP1, the third sub-pixel SP3 and the fourth sub-pixel SP4 are normal sub-pixels and the second sub-pixel SP2 is a defective sub-pixel as a result of sensing the mobility α of the driving transistor DT, it may be determined that there is a short-circuit between the gate electrode and the output terminal of the driving transistor DT of the second sub-pixel SP2.

As described above, when a defective sub-pixel is detected by the detector 170, the compensator 160 may perform the compensation by applying a compensation value of a normal sub-pixel to a defective sub-pixel to normalize it, or may perform the compensation by applying the data voltage Vdata of the defective sub-pixel as the same value as the reference voltage Vref to remove the voltage change in the source electrode of the driving transistor DT of the defective sub-pixel during normal sub-pixel charging. It is, however, to be understood that the present disclosure is not limited thereto. The compensator 160 may compensate for the defective sub-pixel in a variety of compensation methods.

According to the display device 100 and the method for driving the display device 100 according to the exemplary embodiment of the present disclosure, it is possible to sense the mobility α of the driving transistor DT in such a way that the gate electrode of the driving transistor DT is floating even when the switching transistor SWT and the sensing transistor SET share one gate line GL. In order to sense the mobility α of the driving transistor DT, the sensing transistor SET has to be turned on, and the gate electrode of the driving transistor DT has to be floating. However, when the switching transistor SWT and the sensing transistor SET share one gate line GL for achieving the aperture ratio, a gate-high voltage is transferred through the gate line GL to turn on the sensing transistor SET, and the same gate-high voltage is applied to the switching transistor SWT. Accordingly, when the switching transistor SWT is turned on, the gate electrode of the driving transistor DT may not be floating due to the data voltage Vdata transferred through the data line DL. In this regard, in the display device 100 and the method for driving the display device 100 according to an exemplary embodiment of the present disclosure, a plurality of switches SW for removing the electrical connection between the data driver 130 and the plurality of data lines DL is disposed. Accordingly, even when the gate-high voltage is applied to the switching transistor SWT through the gate line GL, the same effect can be achieved as that obtained when the gate electrode of the driving transistor DT is floating by turning off the switch SW to remove the data voltage Vdata applied to the switching transistor SWT. Thus, according to the display device 100 and the method for driving the display device 100 according to the exemplary embodiment of the present disclosure, it is possible to sense the mobility α of the driving transistor DT in such a way that the gate electrode of the driving transistor DT is floating even when the switching transistor SWT and the sensing transistor SET share one gate line GL.

In addition, according to the display device 100 and the method for driving the display device 100 according to the exemplary embodiment of the present disclosure, it is possible to detect if there is a short-circuit between the gate electrode and the output terminal of the driving transistor DT based on the results of sensing the threshold voltage Vth and the mobility α of the driving transistor DT even when the switching transistor SWT and the sensing transistor SET share one gate line GL and a plurality of sub-pixels SP shares the single reference voltage line RVL. For example, when the second sub-pixel SP2 is a defective sub-pixel having a short-circuit between the gate electrode and the source electrode of the driving transistor DT while the first sub-pixel SP1, the third sub-pixel SP3 and the fourth sub-pixel SP4 are normal sub-pixels having no short-circuit between the gate electrode and the source electrode of the driving transistor DT, as the first sub-pixel SP1, the second sub-pixel SP2, the third sub-pixel SP3 and the fourth sub-pixel SP4 share the reference voltage line RVL, as described with reference to FIGS. 4 to 5B, the second sub-pixel SP2 may be determined as a normal sub-pixel while the first sub-pixel SP1, the third sub-pixel SP3 and the fourth sub-pixel SP4 may be determined as defective sub-pixels as a result of sensing the threshold voltage Vth of the driving transistor DT.

However, in the display device 100 and the method for driving the display device 100 according to the exemplary embodiment of the present disclosure, it is possible to accurately detect a defective sub-pixel having a short-circuit between the gate electrode and the output terminal of the driving transistor DT based on the results of sensing the threshold voltage Vth as well as the mobility α of the driving transistor DT, as described above. Specifically, as described above with reference to FIGS. 6 to 7B, when only the second sub-pixel SP2 is a defective sub-pixel, the first sub-pixel SP1, the third sub-pixel SP3 and the fourth sub-pixel SP4 may be detected as normal sub-pixels while the second sub-pixel SP2 may be detected as a defective sub-pixel as a result of sensing the mobility α of the driving transistor DT. Therefore, if a particular sub-pixel SP is detected as a normal sub-pixel while the other sub-pixels SP that share the reference voltage line RVL with the particular sub-pixel SP are detected as defective sub-pixels as a result of sensing the threshold voltage Vth of the driving transistor DT, and the particular sub-pixel SP is detected as a defective sub-pixel while the other sub-pixels SP that share the reference voltage line RVL with the particular sub-pixel SP are detected normal sub-pixels as a result of sensing the mobility (α) of the driving transistor DT, it can be determined that the particular sub-pixel SP is a defective sub-pixel while the other sub-pixels SP are normal sub-pixels. In this manner, in the display device 100 and the method for driving the display device 100 according to the exemplary embodiment of the present disclosure, it is possible to accurately detect a defective sub-pixel having a short-circuit between the gate electrode and the output terminal of the driving transistor DT based on the results of sensing the threshold voltage Vth as well as the mobility α of the driving transistor DT for a plurality of sub-pixels SP.

Figure 8:
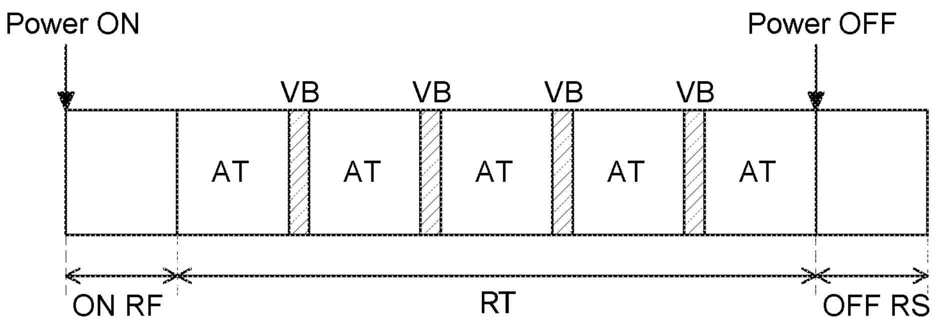
FIG. 8 is a diagram for illustrating time points of detecting a normal sub-pixel and a defective sub-pixel in a display device and a method for driving the display device according to an exemplary embodiment of the present disclosure.

FIG. 8 is a diagram for illustrating time points of detecting a normal sub-pixel and a defective sub-pixel in a display device and a method for driving the display device according to an exemplary embodiment of the present disclosure.

Typically, the time points for detecting a normal sub-pixel and a defective sub-pixel may be divided into time points before and after the display device 100 is released. Before the display device 100 is released, it is detected if there is a defective sub-pixel, and the compensation value for it is reflected in advance to complete compensation for the defective sub-pixel at the time of release of the display device 100.

However, a defective sub-pixel may be generated later on after the display device 100 is released. In this regard, according to the display device 100 and the method for driving the display device 100 according to an exemplary embodiment of the present disclosure, it is possible to detect a defective sub-pixel even after the display device 100 is released. Specifically, the detector 170 may detect a defective sub-pixel in an ON RF mode performed in a power-on sequence, in a RT mode performed in vertical blanks VB between active periods AT during the display driving period, and in an OFF RS mode performed in a power-off sequence.

In the ON RF mode, when a power-on signal is generated in the display device 100 and thus the display device 100 is tuned on, the detector 170 may sense the threshold voltage Vth and the mobility α of the driving transistor DT in each of the sub-pixels SP and may detect a defective sub-pixel having a short-circuit between the gate electrode and the source electrode of the driving transistor DT based on the sensing results.

In the RT mode, during the display driving period when images are displayed, the detector 170 may sense the threshold voltage Vth and the mobility α of the driving transistor DT in each of the sub-pixels SP and may detect a defective sub-pixel having a short-circuit between the gate electrode and the source electrode of the driving transistor DT based on the sensing results. In particular, at every frame during the vertical blanks, the detector 170 may sense the threshold voltage Vth and the mobility α of the driving transistor DT in each of the sub-pixels SP and may detect a defective sub-pixel having a short-circuit between the gate electrode and the source electrode of the driving transistor DT based on the sensing results.

In the OFF RS mode, when a power-off signal is generated in the display device 100 and thus the display device 100 is tuned off, the detector 170 may sense the threshold voltage Vth and the mobility α of the driving transistor DT in each of the sub-pixels SP and may detect a defective sub-pixel having a short-circuit between the gate electrode and the source electrode of the driving transistor DT based on the sensing results.

As described above, in the display device 100 and the method for driving the display device 100 according to the exemplary embodiment of the present disclosure, the detector 170 may detect a defective sub-pixel in the ON RF mode, the RT mode, and the OFF RS mode. However, since the saturation time of the voltage at the source electrode of the driving transistor DT is required, it may take a lot of time during the process of sensing the threshold voltage Vth of the driving transistor DT. In this regard, in the display device 100 and the method for driving the display device 100 according to the exemplary embodiment of the present disclosure, the detector 170 may detect a defective sub-pixel in the OFF RS mode in which display driving is not performed.

The exemplary embodiments of the present disclosure can also be described as follows:

According to an aspect of the present disclosure, a display device comprises a display panel having a plurality of sub-pixels sharing a single reference voltage line, each of the sub-pixels comprising a switching transistor, a driving transistor, a sensing transistor, a storage capacitor, and a light-emitting element; a data driver configured to supply a data voltage to the plurality of sub-pixels; a gate driver configured to supply a gate signal to the plurality of sub-pixels; a timing controller configured to control the data driver and the gate driver; and a detector configured to sense a threshold voltage and mobility of the driving transistor to detect if there is a short-circuit between a gate electrode and an output terminal of the driving transistor.

The timing controller may comprise the detector.

A gate electrode of the sensing transistor and a gate electrode of the switching transistor may be connected to a same gate line.

The detector may be configured to sense the threshold voltage of the driving transistor, to sense the mobility of the driving transistor after its threshold voltage has been compensated for, and to detect if there is a short-circuit between the gate electrode and the output terminal of the driving transistor.

The detector may sense the threshold voltage of the driving transistor based on a source follower topology.

The display device may further comprise a plurality of data lines for transferring the data voltage from the data driver to the plurality of sub-pixels; and a plurality of switches for switching electrical connections between the data driver and the plurality of data lines.

The display device may further comprise an initializing switch connected to the reference voltage line to apply a reference voltage to the sensing transistor; and a sampling switch configured to transfer a voltage from the sensing transistor to the detector, wherein the detector may sense the mobility of the driving transistor from a first time period to a fourth time period, wherein the gate driver may apply a turn-on signal to the sensing transistor and the switching transistor, the data driver may apply a data voltage to the switching transistor, and the reference voltage may be applied to the sensing transistor through the initializing switch during the first time period, wherein the plurality of switches may be turned off to remove electrical connection between the data driver and the plurality of data lines during the second time period, wherein application of the reference voltage to the sensing transistor may be cut off by the initializing switch during the third time period, and wherein a voltage at the output terminal of the driving transistor may be transferred to the detector through the sampling switch during the fourth time period.

The plurality of sub-pixels may comprise a first sub-pixel and a second sub-pixel, and wherein the detector may be configured to determine that there is a short-circuit between a gate electrode and an output terminal of the second sub-pixel if it is detected that the first sub-pixel is a defective sub-pixel while the second sub-pixel is a normal sub-pixel as a result of sensing the threshold voltage of the driving transistor, and that the first sub-pixel may be a normal sub-pixel while the second sub-pixel is a defective sub-pixel as a result of sensing the mobility of the driving transistor.

The detector may be configured to detect if there is a short-circuit between the gate electrode and the output terminal of the driving transistor after a power-off signal of the display device is generated.

According to another aspect of the present disclosure, a method for driving a display device comprises sensing a threshold voltage of a driving transistor of each of a plurality of sub-pixels sharing a single reference voltage line; compensating for the threshold voltage of the driving transistor based on results of sensing the threshold voltage of the driving transistor; sensing mobility of the driving transistor; and determining whether there is a short-circuit between a gate electrode and an output terminal of the driving transistor based on results of sensing the threshold voltage and the mobility of the driving transistor.

The sensing the threshold voltage of the driving transistor and the sensing the mobility of the driving transistor may comprise applying a same gate signal to the switching transistor and the sensing transistor of each of the plurality of sub-pixels.

The sensing the threshold voltage of the driving transistor and the compensating for the threshold voltage of the driving transistor may be performed prior to the sensing the mobility of the driving transistor.

The determining whether there is a short-circuit occurs between the gate electrode and the output terminal of the driving transistor may comprise applying a turn-on signal to a sensing transistor and a switching transistor of each of the plurality of sub-pixels, a data voltage to the switching transistor, and a reference voltage to the sensing transistor; cutting off application of the data voltage to the switching transistor; cutting off application of the reference voltage to the sensing transistor; and sensing a voltage at the output terminal of the driving transistor through the sensing transistor.

The plurality of sub-pixels may comprise a first sub-pixel, a second sub-pixel, a third sub-pixel and a fourth sub-pixel, and wherein the determining whether there is a short-circuit between the gate electrode and the output terminal of the driving transistor may comprise determining that there is a short-circuit between a gate electrode and an output terminal of the second sub-pixel if it is detected that the first sub-pixel, the third sub-pixel and the fourth sub-pixel are defective sub-pixels while the second sub-pixel is a normal sub-pixel as a result of sensing the threshold voltage of the driving transistor, and that the first sub-pixel, the third sub-pixel and the fourth sub-pixel are detected as normal sub-pixels while the second sub-pixel is a defective sub-pixel as a result of sensing the mobility of the driving transistor.

It will be apparent to those skilled in the art that various modifications and variations can be made in the display device and the method for driving the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising:

a display panel having a plurality of sub-pixels sharing a single reference voltage line, each of the sub-pixels comprising a switching transistor, a driving transistor, a sensing transistor, a storage capacitor, and a light-emitting element;

a data driver configured to supply a data voltage to the plurality of sub-pixels;

a plurality of data lines for transferring the data voltage from the data driver to the plurality of sub-pixels;

a gate driver configured to supply a gate signal to the plurality of sub-pixels;

a timing controller configured to control the data driver and the gate driver;

a detector configured to sense a threshold voltage and mobility of the driving transistor to detect if there is a short-circuit between a gate electrode and an output terminal of the driving transistor;

a plurality of switches for switching electrical connections between the data driver and the plurality of data lines;

an initializing switch connected to the reference voltage line to apply a reference voltage to the sensing transistor; and a sampling switch configured to transfer a voltage from the sensing transistor to the detector, wherein the detector senses the mobility of the driving transistor from a first time period to a fourth time period, wherein the gate driver applies a turn-on signal to the sensing transistor and the switching transistor, the data driver applies a data voltage to the switching transistor, and the reference voltage is applied to the sensing transistor through the initializing switch during the first time period, wherein the plurality of switches is turned off to remove electrical connection between the data driver and the plurality of data lines during the second time period, wherein application of the reference voltage to the sensing transistor is cut off by the initializing switch during the third time period, and wherein a voltage at the output terminal of the driving transistor is transferred to the detector through the sampling switch during the fourth time period.

2. The display device of claim 1, wherein the timing controller comprises the detector.

3. The display device of claim 1, wherein a gate electrode of the sensing transistor and a gate electrode of the switching transistor are connected to a same gate line.

4. The display device of claim 1, wherein the detector is configured to sense the threshold voltage of the driving transistor, to sense the mobility of the driving transistor after its threshold voltage has been compensated for, and to detect if there is a short-circuit between the gate electrode and the output terminal of the driving transistor.

5. The display device of claim 4, wherein the detector senses the threshold voltage of the driving transistor based on a source follower topology.

6. The display device of claim 4, wherein the plurality of sub-pixels comprises a first sub-pixel and a second sub-pixel, and wherein the detector is configured to determine that there is a short-circuit between a gate electrode and an output terminal of the second sub-pixel if it is detected that the first sub-pixel is a defective sub-pixel while the second sub-pixel is a normal sub-pixel as a result of sensing the threshold voltage of the driving transistor, and that the first sub-pixel is a normal sub-pixel while the second sub-pixel is a defective sub-pixel as a result of sensing the mobility of the driving transistor.

7. The display device of claim 1, wherein the detector is configured to detect if there is a short-circuit between the gate electrode and the output terminal of the driving transistor after a power-off signal of the display device is generated.

8. A method for driving a display device, the method comprising:

sensing a threshold voltage of a driving transistor of each of a plurality of sub-pixels sharing a single reference voltage line;

compensating for the threshold voltage of the driving transistor based on results of sensing the threshold voltage of the driving transistor;

sensing mobility of the driving transistor; and determining whether there is a short-circuit between a gate electrode and an output terminal of the driving transistor based on results of sensing the threshold voltage and the mobility of the driving transistor, wherein the determining whether there is a short-circuit occurs between the gate electrode and the output terminal of the driving transistor comprises:

applying a turn-on signal to a sensing transistor and a switching transistor of each of the plurality of sub-pixels, a data voltage to the switching transistor, and a reference voltage to the sensing transistor;

cutting off application of the data voltage to the switching transistor;

cutting off application of the reference voltage to the sensing transistor; and sensing a voltage at the output terminal of the driving transistor through the sensing transistor.

9. The method for claim 8, wherein the sensing the threshold voltage of the driving transistor and the sensing the mobility of the driving transistor comprise applying a same gate signal to the switching transistor and the sensing transistor of each of the plurality of sub-pixels.

10. The method for claim 8, wherein the sensing the threshold voltage of the driving transistor and the compensating for the threshold voltage of the driving transistor are performed prior to the sensing the mobility of the driving transistor.

11. The method of claim 8, wherein the plurality of sub-pixels comprises a first sub-pixel, a second sub-pixel, a third sub-pixel and a fourth sub-pixel, and wherein the determining whether there is a short-circuit between the gate electrode and the output terminal of the driving transistor comprises determining that there is a short-circuit between a gate electrode and an output terminal of the second sub-pixel if it is detected that the first sub-pixel, the third sub-pixel and the fourth sub-pixel are defective sub-pixels while the second sub-pixel is a normal sub-pixel as a result of sensing the threshold voltage of the driving transistor, and that the first sub-pixel, the third sub-pixel and the fourth sub-pixel are detected as normal sub-pixels while the second sub-pixel is a defective sub-pixel as a result of sensing the mobility of the driving transistor.

* * * * *